United States Patent
Yasumuro

(10) Patent No.: US 7,702,930 B2
(45) Date of Patent: Apr. 20, 2010

(54) POWER-SUPPLY CONTROL DEVICE, POWER-SUPPLY CONTROL METHOD, AND COMPUTER PRODUCT

(75) Inventor: Taketoshi Yasumuro, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 635 days.

(21) Appl. No.: 11/311,048

(22) Filed: Dec. 19, 2005

(65) Prior Publication Data

US 2006/0107033 A1 May 18, 2006

Related U.S. Application Data

(63) Continuation of application No. PCT/JP03/10415, filed on Aug. 18, 2003.

(30) Foreign Application Priority Data

Aug. 18, 2003 (JP) ............... 2003/10415

(51) Int. Cl.
*G06F 1/00* (2006.01)
*G06F 1/26* (2006.01)

(52) U.S. Cl. ............ 713/300; 713/320; 713/323; 713/324; 713/330; 714/3; 714/14

(58) Field of Classification Search .......... 713/300, 713/320, 323, 324, 330; 714/3, 14
See application file for complete search history.

(56) References Cited

U.S. PATENT DOCUMENTS 4,982,430 A * 1/1991 Frezza et al. ............... 380/211

| | | | |
|---|---|---|---|
| 6,269,288 B1 * | 7/2001 | Smith | 700/295 |
| 6,493,824 B1 * | 12/2002 | Novoa et al. | 713/162 |
| 2002/0126635 A1 * | 9/2002 | Sugiyama et al. | 370/329 |
| 2003/0142561 A1 * | 7/2003 | Mason et al. | 365/200 |
| 2004/0022225 A1 * | 2/2004 | Liang et al. | 370/338 |

FOREIGN PATENT DOCUMENTS

| | | |
|---|---|---|
| EP | 1 134 656 | 9/2001 |
| JP | 61-263346 | 11/1986 |
| JP | 04021236 A * | 1/1992 |
| JP | 4-370858 | 12/1992 |
| JP | 6-119089 | 4/1994 |

(Continued)

OTHER PUBLICATIONS

Magic Packet Technology, Feb. 6, 2003 http://www.amd.com/gb-ul/ConnectivitySolutions/ProductInformation/0,,50_2330_2403_2420^2481,00.html.

(Continued)

*Primary Examiner*—Thomas Lee
*Assistant Examiner*—Michael J Brown
(74) *Attorney, Agent, or Firm*—Katten Muchin Rosenman LLP

(57) ABSTRACT

A control device controls a device to be on and off in response to boot data that instructs boot of the device. The control device includes a receiving unit that receives the boot data through a network; a counting unit configured to count the number of the boot data received within a predetermined time; and a control unit that controls to turn on and to turn off the device. The control device controls to turn on the device when the number of the boot data counted is "1". The control device controls to turn off the device when the number of the boot data counted is "N".

9 Claims, 7 Drawing Sheets

FOREIGN PATENT DOCUMENTS

| | | |
|---|---|---|
| JP | 7-115428 | 5/1995 |
| JP | 9-188038 | 7/1997 |
| JP | 2000-209220 | 7/2000 |
| JP | 2001-43098 | 2/2001 |
| JP | 2002-27135 | 1/2002 |
| JP | 2002-44177 | 2/2002 |
| JP | 2003-084870 | 3/2003 |

OTHER PUBLICATIONS

Building a Managed Computing Environment, Jun. 18, 2003, http://www.intel.com/network/connectivity/resources/doc_library/whitepapers/solutions/managed_environment.htm.

Wake up to Wake-on-LAN, May 13, 2003, http://www.networking.ibm.com/eji/ejiwake.html.

Notice of Rejection mailed Jul. 8, 2008, from the corresponding Japanese Application.

* cited by examiner

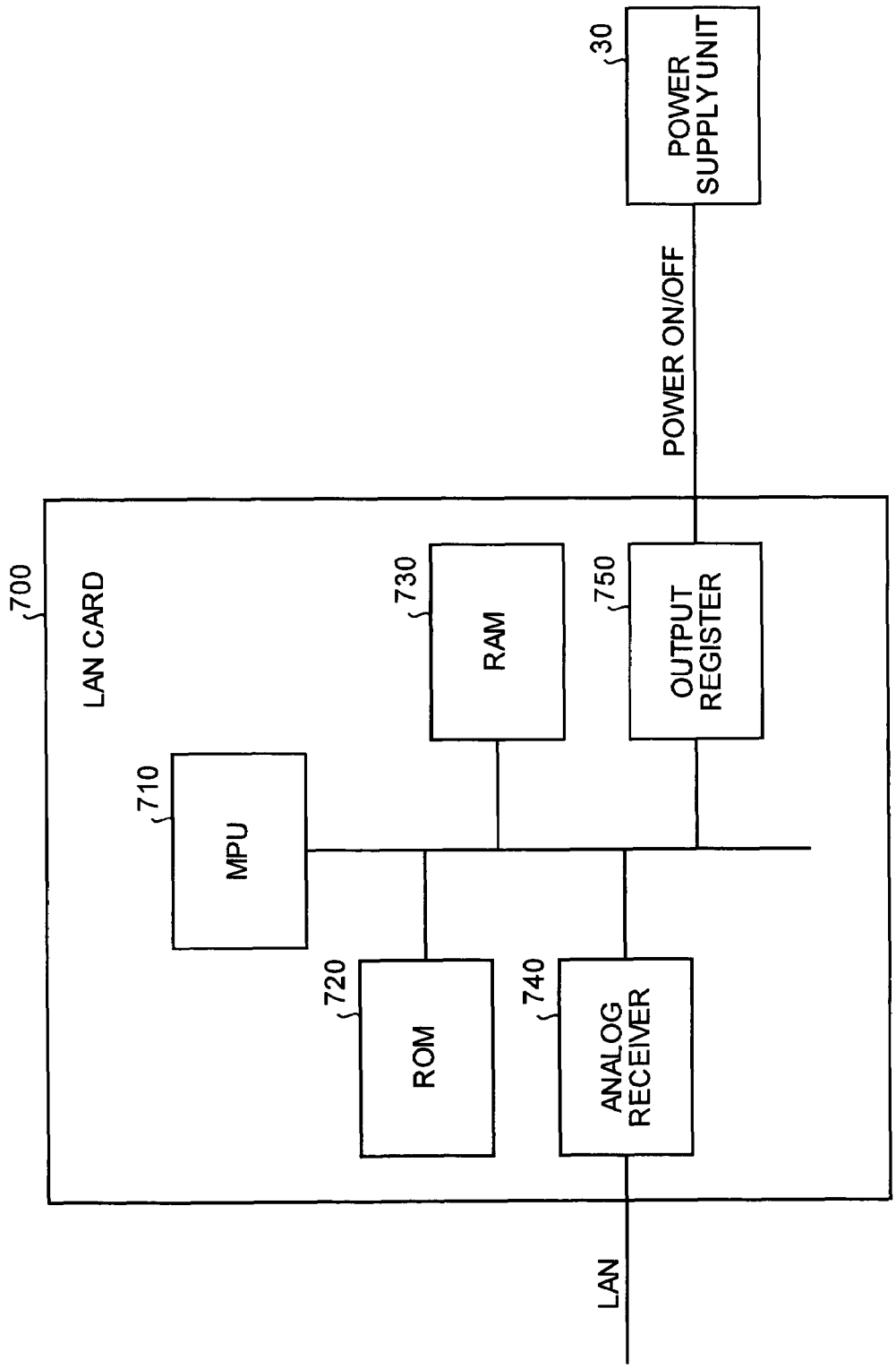

POWER-SUPPLY CONTROL DEVICE, POWER-SUPPLY CONTROL METHOD, AND COMPUTER PRODUCT

CROSS-REFERENCE TO RELATED APPLICATION

This application is a continuation of International Application PCT/JP2003/10415 filed on Aug. 18, 2003, now pending, the contents of which are herein wholly incorporated by reference.

BACKGROUND OF THE INVENTION

1. Field of the Invention

The present invention relates to a technology for controlling a device in turning the device on and off through a network.

2. Description of the Related Art

A technology for remotely booting an information processor such as a personal computer (PC) from an external device through a local area network (LAN) has been developed. Such a technology is disclosed in, for example, "Magic Packet™ Technology", searched on Feb. 6, 2003, <URL: http://www.amd.com/gb-uk/ConnectivitySolutions/Product-Information/0,50_2330_2403_2420^2481,00.html>, "Building a Managed Computing Environment", searched on Jun. 18, 2003, <URL:http://www.intel.com/network/connectivity/resources/do c_library/white_papers/solutions/managed_environment.htm>, and "Wake up to Wake-on-LAN", searched on May 13, 2003, <URL:http://www.networking.ibm.com/eji/ejiwake.html>. For example, FIG. 6 is a block diagram of a conventional LAN card that enables a remote boot of a main unit. A LAN card 60 is connected to a power supply unit 30 in the main unit with a three-pin connector 20. Thus, a remote boot of a main unit 6 of a PC through the LAN is enabled. A PCI2.2-compliant PCI (peripheral component interconnect) bus can be used instead of the connector 20.

The LAN card 60 includes a power controller 600. When receiving a boot packet for instructing a boot of the main unit 6, the power controller 600 outputs a boot signal to the power supply unit 30. The power controller 600 is supplied with power from the power supply unit 30 through the connector 20.

The power controller 600 includes an analog receiver 610 and a protocol analyzer 620. The analog receiver 610 receives an analog signal from the LAN and converts the analog signal into digital data to transmit to the protocol analyzer 620.

The protocol analyzer 620 analyzes the digital data. The protocol analyzer 620 includes a boot packet detector 621 that detects a boot packet. The boot packet detector 621 detects the boot packet in the digital data, and outputs a boot signal to the power supply unit 30.

The main unit 6 can be remotely booted through the LAN in such a manner that the power controller 600 detects the boot packet and outputs the boot signal for turning on the power for the main unit 6, to the power supply unit 30. In other words, an external device connected to the main unit 6 through the LAN can remotely boot the main unit 6 by transmitting the boot packet to the main unit 6.

In the conventional technologies, however, a device cannot be controlled to be shut down remotely from an external device. To shut down the device, it is necessary to use a shutdown function provided by an operating system in the device.

If the operating system is out of control, for example, due to a hang up of the device, the device cannot be remotely shut down.

SUMMARY OF THE INVENTION

It is an object of the present invention to at least solve the problems in the conventional technology.

A control device according to one aspect of the present invention controls a device to be on and off in response to boot data for instructing boot of the device. The control device includes a receiving unit configured to receive the boot data through a network; a counting unit configured to count the number of the boot data received within a predetermined time; and a control unit configured to perform any one of an operation to turn on the device and an operation to turn off the device, based on counted number.

A control device according to another aspect of the present invention controls a device to be on and off in response to boot data for instructing boot of the device. The control device includes a receiving unit configured to receive the boot data through a network; a counting unit configured to count the number of the boot data received within a predetermined time; and a control unit configured to perform any one of an operation to turn on the device, an operation to turn off the device, and an operation to reset the device, based on counted number.

A method according to still another aspect of the present invention is of controlling a device to be on and off in response to boot data for instructing boot of the device. The method includes receiving the boot data through a network; counting the number of the boot data received within a predetermined time; and performing any one of an operation to turn on the device and an operation to turn off the device, based on counted number.

A method according to still another aspect of the present invention is a method of controlling a device to be on and off in response to boot data for instructing boot of the device. The method includes receiving the boot data through a network; counting the number of the boot data received within a predetermined time; and performing any one of operation to turn on the device, an operation to turn off the device, and an operation to reset the device, based on counted number.

According to still another aspect of the present invention an electric device includes a communication unit for communicating with an external device; a power supply unit for supplying power to said electric device; a detecting unit for detecting whether a certain data is received or not; and a control unit for controlling said power supply unit, wherein said control unit turns off said power supply unit when said detecting unit detects a predetermined number of certain data is received.

A method according to still another aspect of the present invention is a method for controlling a device, comprising the steps of counting a number of received information instructing booting of said device; controlling said device to be turned off when a number of received information reaches a predetermined number; and controlling said device to be turned on when a number of received information does not reach said predetermined number.

A method according to still another aspect of the present invention an adapter detachably connected to an electric device includes a communication unit; a detector for detecting whether a certain information is received through said communication unit; and a counter for counting a number of received certain information.

A computer-readable recording medium according to still another aspect of the present invention stores a computer program for realizing the method according to the above aspects.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 7 is a block diagram of a LAN card having a microprocessor unit (MPU) that executes a power supply control program.

DETAILED DESCRIPTION OF THE PREFERRED EMBODIMENTS

Exemplary embodiments according to the present invention are explained in detail below with reference to the accompanying drawings. A case where the present invention is applied to a LAN card is mainly explained in the embodiments.

Figure 1:
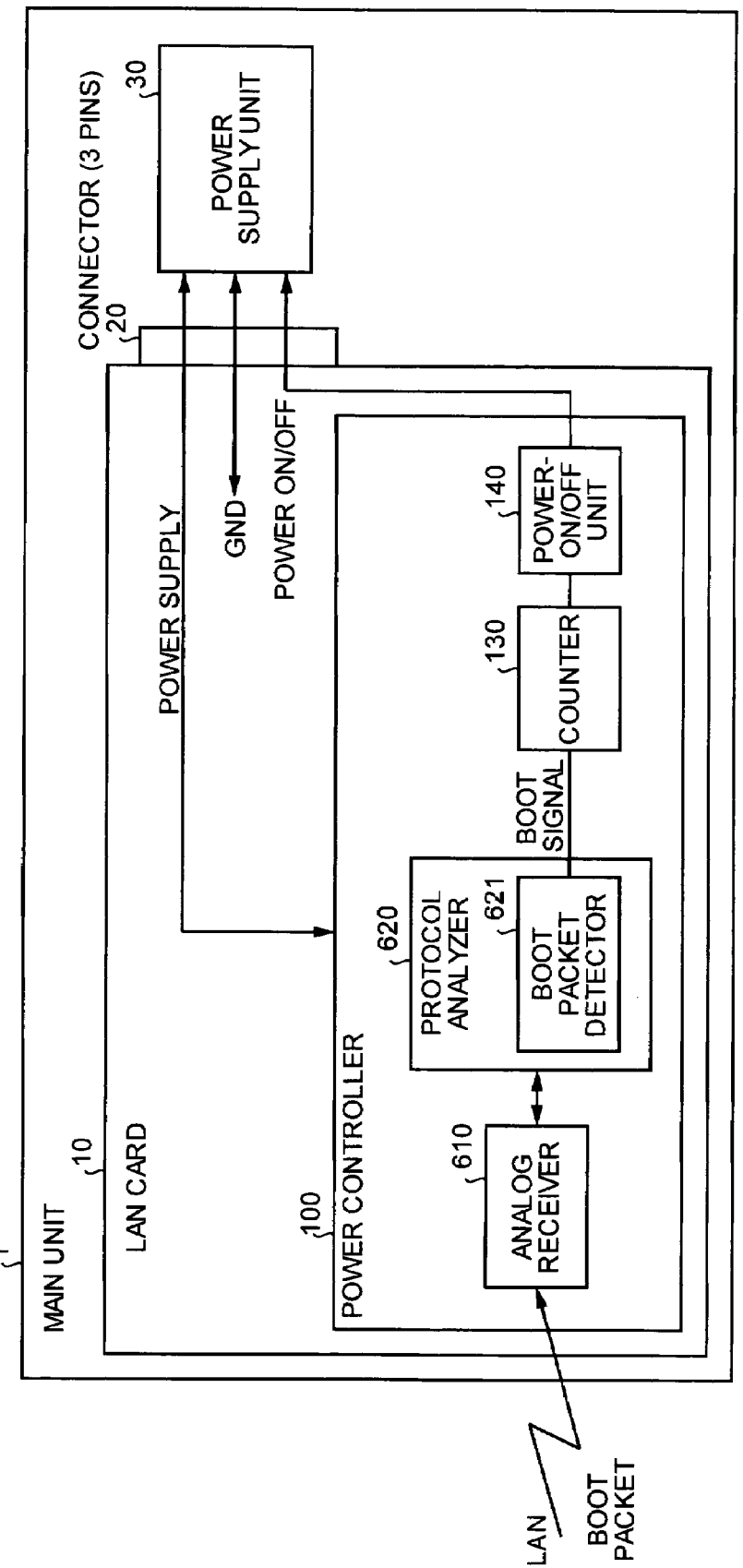
FIG. 1 is a block diagram of a LAN card according to one embodiment of the present invention.

FIG. 1 is a block diagram of a LAN card according to the embodiment. Like reference characters designate like parts throughout the drawings, and detailed explanation is omitted.

As shown in FIG. 1, a power supply controller 100 of a LAN card 10 includes the analog receiver 610, the protocol analyzer 620, a counter 130, and a power-on/off unit 140.

The counter 130 counts the number of boot signals output by the boot packet detector 621 in the protocol analyzer 620 within a predetermined time, and sends information on the number of the boot signals counted to the power-on/off unit 140.

The power-on/off unit 140 receives the information on the number, and outputs a power-on signal or a power-off signal to the power supply unit 30 based on the number. Specifically, when the number is "1", the power-on/off unit 140 outputs the power-on signal to instruct boot of the main unit 1 to the power supply unit 30. The power-on/off unit 140 outputs the power-off signal to instruct shutdown of the main unit 1 to the power supply unit 30 when the number is a predetermined number "N".

Thus, in addition to a remote boot, a remote shutdown of the main unit 1 through a LAN is possible.

In other words, when an external device connected to the main unit 1 through the LAN transmits one boot packet to the main unit 1 within a predetermined time, the external device can remotely boot the main unit. On the other hand, when the external device transmits N pieces of boot packets within a predetermined time, the external device can remotely shutdown the main unit 1.

Figure 2:
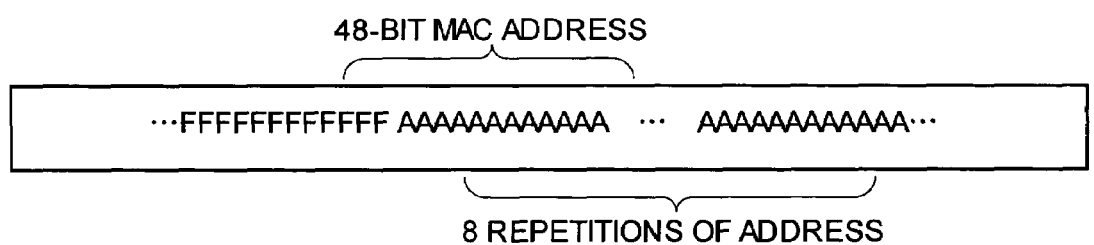
FIG. 2 is a schematic for illustrating a boot packet.

FIG. 2 is a schematic for illustrating the boot packet. The boot packet includes data that has 12 pieces of 0xF and subsequently at least eight repetitions of a 48-bit address 0xAAAAAAAAAAAA. "0x" indicates a hexadecimal number, and 12 pieces of 0xF is data for synchronization, and 0xAAAAAAAAAAAA is a medium access control (MAC) address of the main unit 1.

The boot packet detector 621 detects the boot packet from packets received by the analog receiver 610, and outputs a boot signal to the counter 130.

Figure 3:
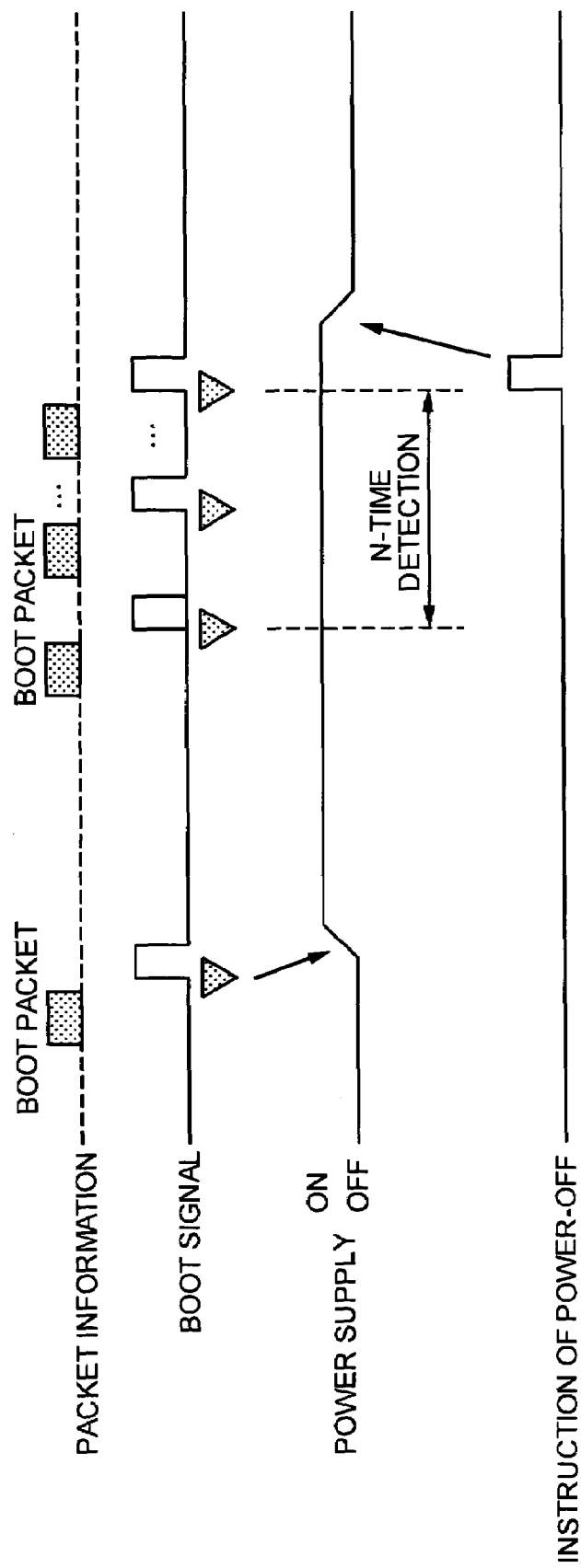
FIG. 3 is a time chart for illustrating operations of the LAN card according to the embodiment.

FIG. 3 is a time chart of operations of turning on and off the main unit 1 by the LAN card 10 according to the embodiment. In the LAN card 10, if the analog receiver 610 receives one boot packet within a predetermined time, the boot packet detector 621 generates one boot signal, and the counter 130 counts one boot signal. Then, the counter 130 sends the number "1" counted for the boot signal to the power-on/off unit 140, and the power-on/off unit 140 outputs a signal for turning on the main unit 1.

Thereafter, if the analog receiver 610 receives N pieces of boot packets within the predetermined time, then the boot packet detector 621 generates N pieces of boot signals, and the counter 130 counts N boot signals. The counter 130 sends the number "N" counted for the boot signals to the power-on/off unit 140, and the power-on/off unit 140 outputs a signal for turning off the power for the main unit 1.

In the embodiment, the boot packet detector 621 detects the boot packet to generate the boot signal, the counter 130 counts the number of boot signals generated within a predetermined time, and the power-on/off unit 140 outputs the signal for turning on the power supply unit 30 when the number of the boot signals counted is "1", and outputs the signal for turning off the power thereto when the number is "N". Therefore, external device connected to the main unit 1 through the LAN can perform not only a remote boot but also a remote shutdown on the main unit 1.

In the embodiment above, when the counter 130 counts the N number of boot signals, the power-on/off unit 140 unconditionally outputs the signal for turning off the main unit 1. Therefore, if N pieces of boot packets are erroneously transmitted from the external device within the predetermined time, the main unit 1 can be erroneously turned off.

Figure 4:
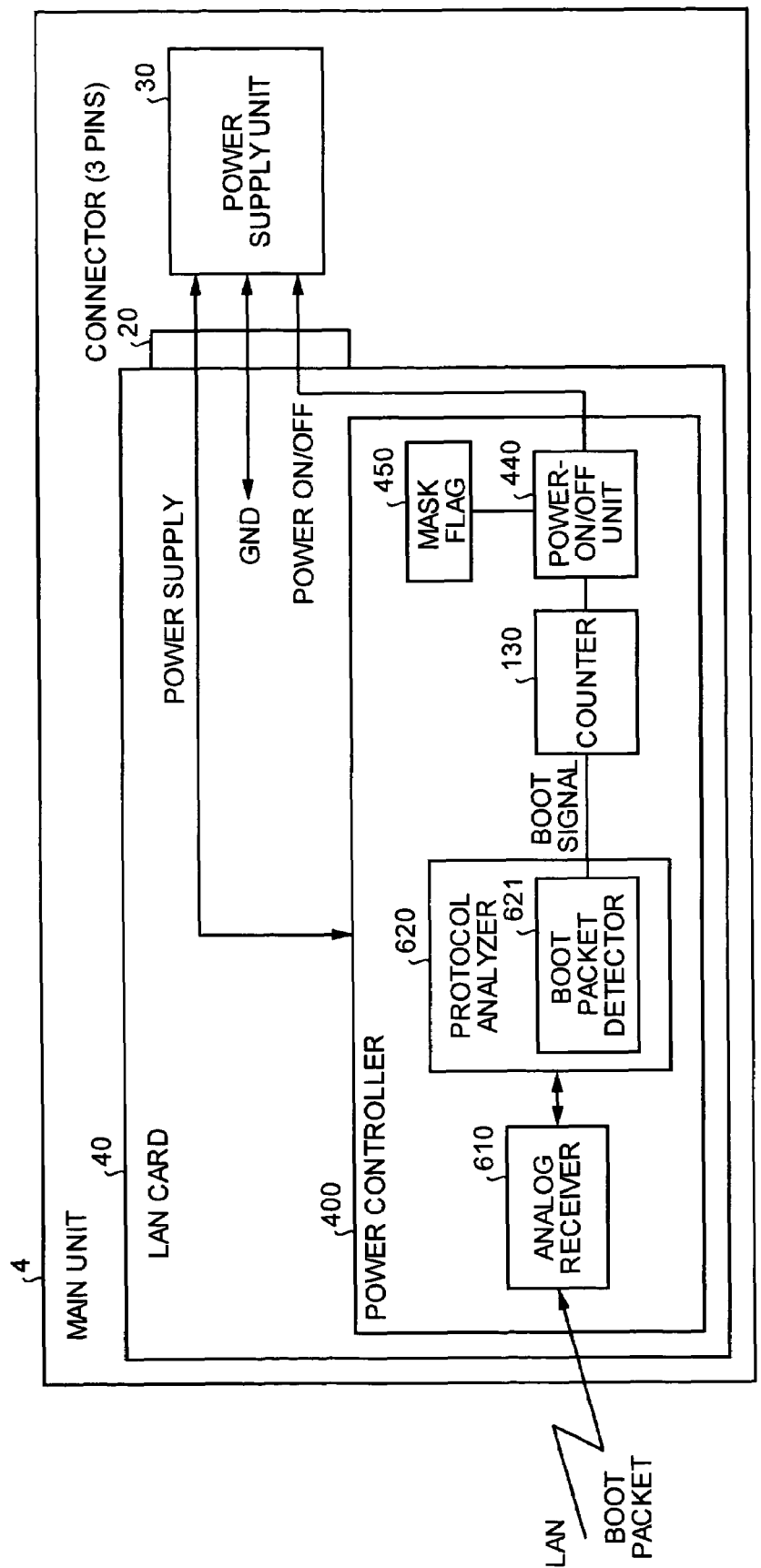
FIG. 4 is a block diagram of a LAN card having a power-off mask function.

FIG. 4 is a block diagram of a LAN card having a power-off mask function. As shown in FIG. 4, a power supply controller 400 of a LAN card 40 includes the analog receiver 610, the protocol analyzer 620, the counter 130, a power-on/off unit 440, and a mask flag 450.

Similarly to the power-on/off unit 140, the power-on/off unit 440 outputs a power-on signal to the power supply unit 30 when the number of boot signals received from the counter 130 is "1", and outputs a power-off signal thereto when the number of boot signals is the predetermined number "N".

When the power-off signal is to be output, the power-on/off unit 440 refers to the mask flag 450. If the mask flag 450 is set, the power-on/off unit 440 does not output the power-off signal.

The mask flag 450 indicates whether the power-off of a main unit 4 is masked. The mask flag 450 is set by the main unit 4, and by setting the mask flag 450, the main unit 4 can be prevented from erroneous shutdown by the power supply controller 400.

In this manner, the power-on/off unit 440 refers to the mask flag 450. If the mask flag 450 is set, the power-off signal to the power supply unit 30 is masked, thereby preventing undesired shutdown of the main unit 4. More specifically, even if an external device erroneously transmits N pieces of boot packets within the predetermined time, the main unit 4 can be prevented from being erroneously shutdown.

Figure 5:
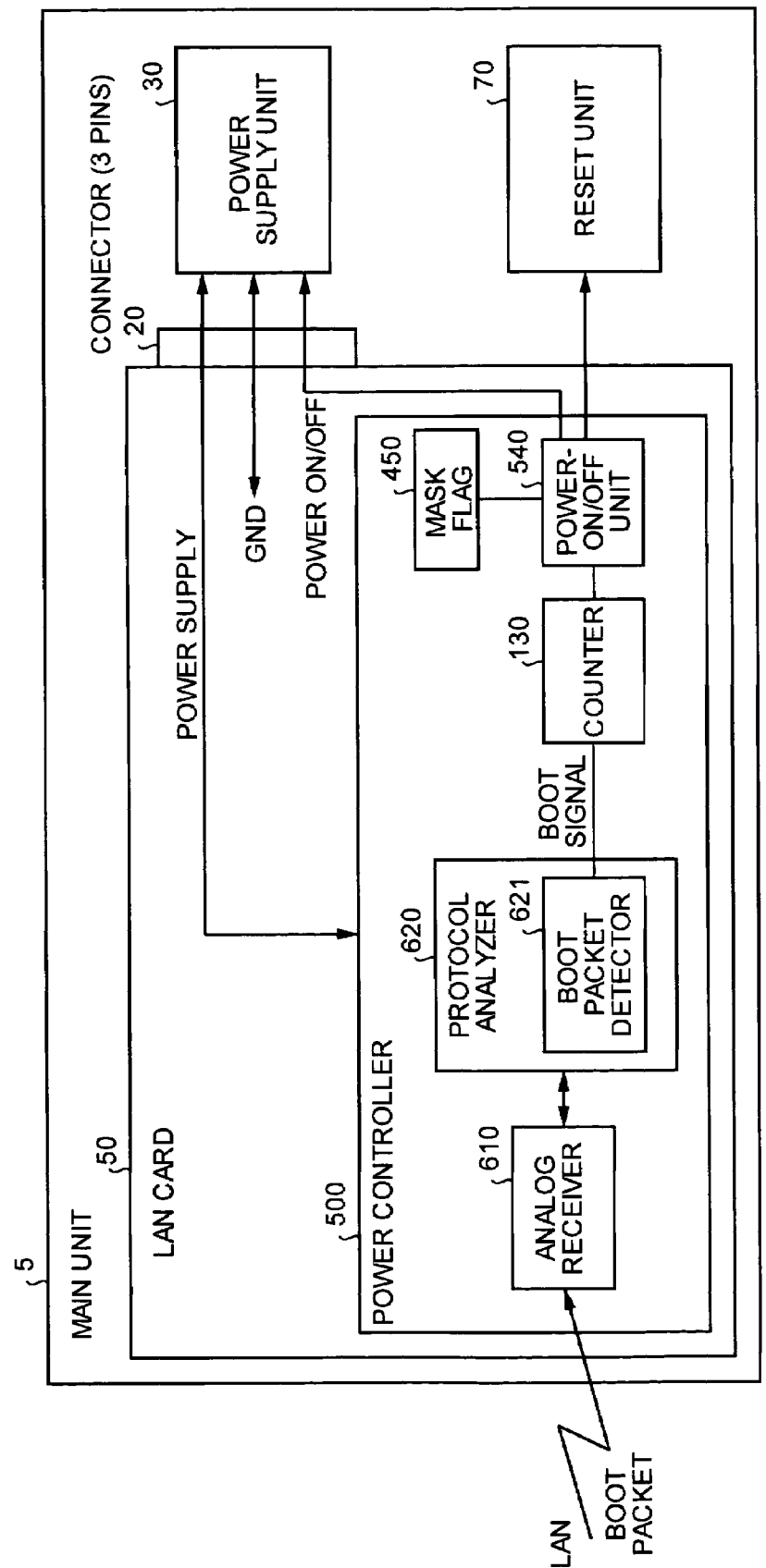
FIG. 5 is a functional block diagram of a LAN card having a reset function.
Figure 6:
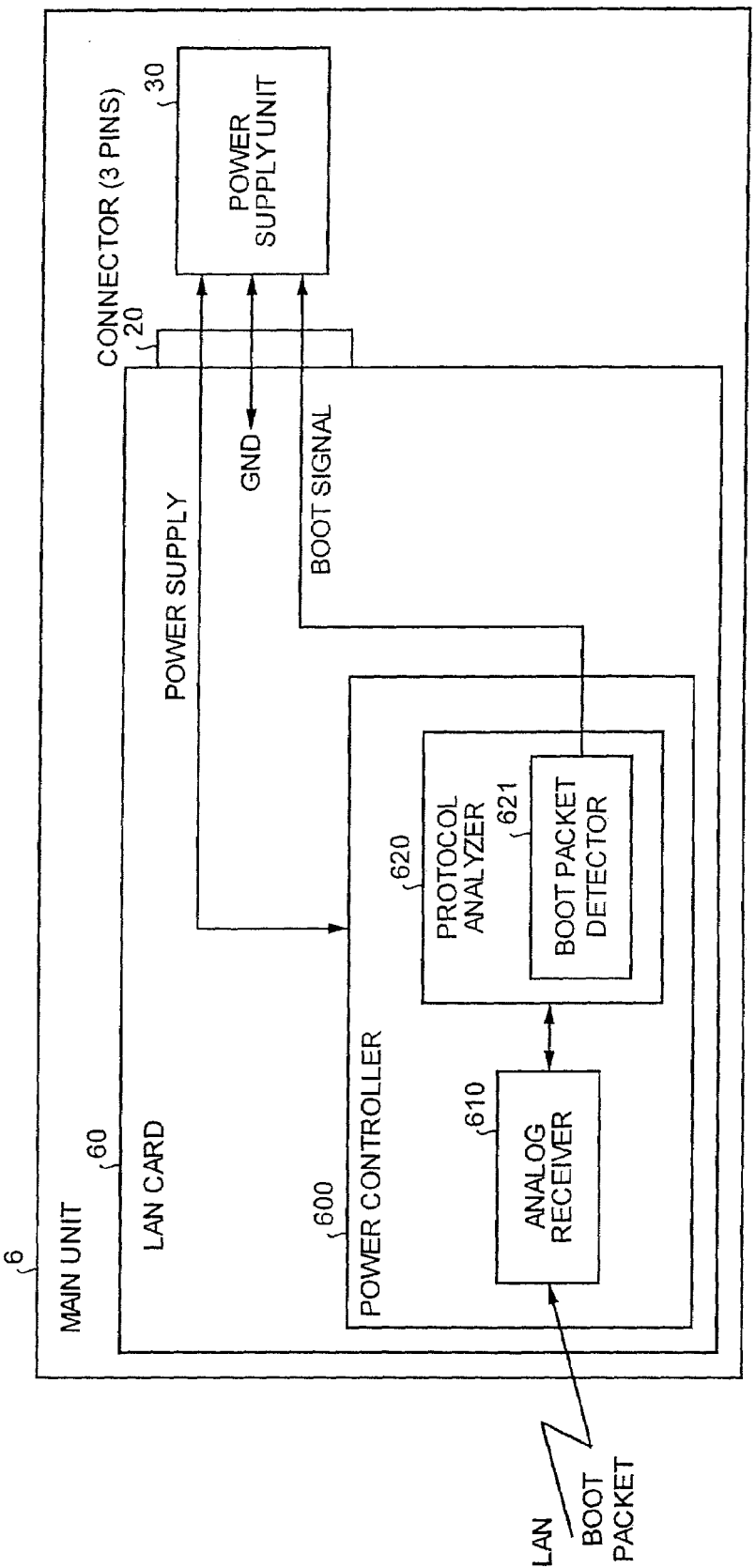
FIG. 6 is a block diagram of a conventional LAN card that enables a remote boot of a main unit.

There are some other cases that requires reset of a device, such as when a PC that hangs up. FIG. 5 is a block diagram of a LAN card having a reset function.

As shown in FIG. 5, a power controller 500 of a LAN card 50 includes the analog receiver 610, the protocol analyzer 620, the counter 130, a power-on/off unit 540, and the mask flag 450.

The power-on/off unit 540 outputs a power-on signal to the power supply unit 30 when the number of boot signals received from the counter 130 is "1", and outputs a power-off signal thereto when the number of boot signals is the predetermined number "N".

When the number of boot signals received from the counter 130 is greater than the predetermined number "N", the power-on/off unit 540 outputs a reset signal to a reset unit 70.

When the power-off signal or the reset signal is to be output, the power-on/off unit 540 refers to the mask flag 450. If the mask flag 450 is set, the power-on/off unit 540 does not output the power-off signal or the reset signal.

As explained above, when the number of boot signals received from the counter 130 is greater than the predetermined number "N", the power-on/off unit 540 outputs the reset signal to the reset unit 70, so that a main unit 5 can be remotely reset from external device through a LAN.

Although the case where the present invention is used for the LAN card is explained in the embodiment, the present invention is not limited thereto, and is also applicable to a main unit that incorporates a LAN interface.

Although the case where the boot packet is received through the LAN is explained in the embodiment, the present invention is not limited thereto, and is also applicable to a case where another network is used.

Furthermore, by implementing the function of the power supply unit according to the embodiment by software, a power supply control program having the same function as above can be obtained.

FIG. 7 is a block diagram of a LAN card having an MPU that executes the power supply control program. A LAN card 700 includes an MPU 710, a ROM 720, a RAM 730, an analog receiver 740, and an output register 750.

The MPU 710 executes the power supply control program. The ROM 720 is stores therein the power supply control program. The MPU 710 reads the power supply control program from the ROM 720 to execute the power supply control program. The RAM 730 stores a temporary calculation result while the power supply control program is executed.

The analog receiver 740 receives an analog signal from the LAN and converts the analog signal into digital data. The digital data is analyzed by the power supply control program, and the number of boot packets is counted.

The output register 750 stores a power-on signal or a power-off signal to be output to the power supply unit 30. The power supply control program performs turning on or off the main unit by setting the output register 750 based on the number of the boot packets.

According to the embodiments described above, a remote boot and a remote shutdown of the controlled device through a network are possible.

Moreover, according to the embodiments described above, remote boot, remote shutdown, and remote reset of the controlled device through a network are possible.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A control device that controls a device to be on and off in response to one or more boot packets for instructing boot of the device, the control device comprising:
    a receiving unit configured to receive the one or more boot packets through a network;
    a counting unit configured to count the number of boot packets received within a predetermined time and to output a signal corresponding to the number;
    a control unit configured to perform an operation to turn on the device when the number of the received boot packet is a first predetermined number, and an operation to turn off the device when the number of the received boot packets is a second predetermined number; and
    a mask unit configured to cancel an operation to be performed by the control unit to turn off the device.

2. The control device according to claim 1, wherein the network includes a local area network.

3. A control device that controls a device to be on and off in response to one or more boot packets for instructing boot of the device, the control device comprising:
    a receiving unit configured to receive the one or more boot packets through a network;
    a counting unit configured to count the number of boot packets received within a predetermined time and to output a signal corresponding to the number;
    a control unit configured to perform an operation to turn on the device when the number of the received boot packets is a first predetermined number, an operation to turn off the device when the number of the received boot packets is a second predetermined number, and an operation to reset the device when the number of the received boot packets is greater than the second predetermined number; and
    a mask unit configured to cancel the turn off operation to be performed by the control unit to turn off the device, when a masking condition is detected.

4. A method of controlling a device to be on and off in response to one or more boot packets for instructing boot of the device, the method comprising the steps of:
    receiving one or more boot packets;
    counting the number of boot packets received within a predetermined time and to outputting a signal corresponding to the number;
    performing an operation to turn on the device when the number of the received boot packets is a first predetermined number, and an operation to turn off the device when the number of the received boot packets is a second predetermined number; and
    canceling the turn off operation to be performed by the performing step to turn off the device, when a masking condition is detected.

5. The method according to claim 4, wherein the network includes a local area network.

6. A method of controlling a device to be on and off in response to one or more boot packets for instructing boot of the device, the method comprising the steps of:
    receiving one or more boot packets;
    counting the number of boot packets received within a predetermined time and to outputting a signal corresponding to the number;
    performing an operation to turn on the device when the number of the received boot packets is a first predetermined number, an operation to turn off the device when the number of the received boot packets is a second predetermined number, and an operation to reset the device when the number of the received packets is greater than the second predetermined number; and canceling the turn off operation to be performed by the performing step to turn off the device, when a masking condition is detected.

7. A computer-readable recording medium that stores a computer program for controlling a device to be on and off in response to one or more boot packets for instructing boot of the device, the computer program making a computer execute:

receiving one or more boot packets;

counting the number of boot packets received within a predetermined time and to outputting a signal corresponding to the number;

performing an operation to turn on the device when the number of the received boot packets is a first predetermined number, and an operation to turn off the device when the number of the received boot packets is a second predetermined number; and canceling the turn off operation to be performed by the performing step to turn off the device, when a masking condition is detected.

8. A method of controlling a device, comprising the steps of:

counting, within a predetermined time, a number of received packets instructing booting of said device;

when the device is in an ON position, controlling said device to be turned off when a number of received packets reaches a predetermined number;

when the device is in an OFF position, controlling said device to be turned on when a number of received packets does not reach said predetermined number; and canceling the turn off operation to be performed by the controlling step to turn off the device, when a masking condition is detected.

9. An adapter detachably connected to an electric device, comprising:

a communication unit;

a detector for detecting whether one or more certain packets are received through said communication unit;

a counter for counting a number of certain packets received within a predetermined time and for outputting a signal corresponding to the number;

a controller for controlling a power unit of said electronic device, wherein said controller controls said power unit to be turned off when the number of the certain packets received exceeds a predetermined number; and a mask unit configured to cancel the turn off operation to be performed by the control unit to turn off the device, when a masking condition is detected.

* * * * *